United States Patent Office 3,541,142
Patented Nov. 17, 1970

3,541,142
[4-(2-HYDROXYMETHYLALKANOYL)-
PHENOXY] ACETIC ACIDS
Edward J. Cragoe, Jr., Lansdale, Pa., assignor to Merck & Co., Inc., Rahway, N.J., a corporation of New Jersey
No Drawing. Filed Sept. 2, 1966, Ser. No. 576,854
Int. Cl. C07c 63/36
U.S. Cl. 260—521                                6 Claims

ABSTRACT OF THE DISCLOSURE

A method for the preparation of diuretically active [4-(2-methylenealkanoyl)phenoxy]acetic acid products via the reaction of a [4-[2-(hydroxymethyl)alkanoyl] phenoxy]acetic acid with an acidic reagent. The [4-[2-(hydroxymethyl)alkanoyl]phenoxy]acetic acid starting materials of the process are novel compounds, also useful as diuretics, which may be synthesized by treating a (4-alkanoylphenoxy)acetic acid with an aqueous solution of formaldehyde in the presence of an acid.

This invention relates to a new method for the preparation of [4-(2-methylenealkanoyl)phenoxy]acetic acids and to the nontoxic, pharmacologically acceptable salts, esters and amide derivatives thereof.

Pharmacological studies show that the instant products are effective diuretic and saluretic agents which can be used in the treatment of conditions associated with electrolyte and fluid retention and hypertension. When administered in therapeutic dosages, in conventional vehicles, the instant products effectively reduce the amount of sodium and chloride ions in the body, lower dangerous excesses of fluid levels to acceptable limits and, in general alleviate conditions associated with edema.

Also included within this invention are the [4-[2-(hydroxymethyl)alkanoyl]phenoxy]acetic acid precursors from which the [4-(2-methylenealkanoyl)phenoxy]acetic acid products are obtained. In addition to their utility as intermediates the said [4-[2-(hydroxymethyl)alkanoyl]phenoxy]acetic acids also exhibit diuretic activity and, therefore, are also useful in the treatment of conditions associated with electrolyte and fluid retention.

The process of this invention comprises treating a [4-[2-(hydroxymethyl)alkanoyl]phenoxy]acetic acid (II, infra) with an acidic reagent capable of eliminating water therefrom. In general, any acid may be used to effect the elimination, it only being necessary to render the reaction mixture sufficiently acidic so as to effect the elimination of water. However, it has been found that the reagent employed should be of sufficient strength as to be a moderately strong or strong acid. Typical of the acids which may be employed include, for example, concentrated sulfuric acid, para-toluenesulfonic acid monohydrate, methanesulfonic acid etc., and Lewis Acids such as boron trifluoride, etc.

The following equation illustrates this method of preparation:

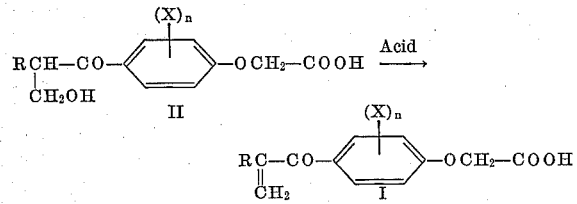

wherein R is hydrogen, alkyl, for example, lower alkyl such as methyl, ethyl, propyl, isopropyl, butyl, pentyl etc. or trifluoromethyl substituted lower alkyl, for example 2,2,2-trifluoroethyl, 2,2,2-trifluoroisopropyl, etc.; the X radicals are similar or dissimilar members selected from hydrogen, halogen, lower alkyl, lower alkoxy or, taken together, two X radicals on adjacent carbon atoms of the benzene ring may be joined to form an hydrocarbylene chain (i.e., a divalent organic radical composed solely of carbon and hydrogen) containing from 3–4 carbon atoms between their points of attachment, for example, trimethylene, tetramethylene, 1,3-butadienylene (i.e., —CH=CH—CH=CH—), etc., and $n$ is an integer having a value of 1–2.

A preferred embodiment of this invention comprises the elimination of water from a [2,3-disubstituted-4-[2-(hydroxymethyl)alkanoyl]phenoxy]acetic acid (IIa, infra) by treatment with a strong acid according to the following equation to obtain a corresponding [2,3-disubstituted-4-(2-methylenebutyryl)phenoxy]acetic acid (Ia, infra):

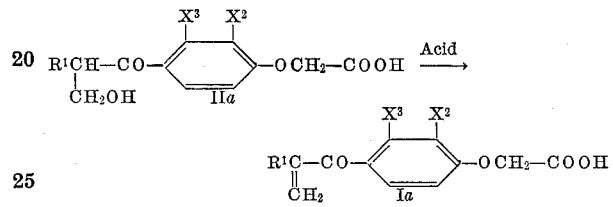

wherein $R^1$ is lower alkyl and $X^2$ and $X^3$ are similar or dissimilar members selected from hydrogen, halogen or lower alkyl. The foregoing class of compounds exhibits particularly good diuretic and saluretic activity and represents a preferred subgroup within the scope of this invention.

The instant [4-(2-methylenealkanoyl)phenoxy]acetic acid products (I) are generally obtained as crystalline solids and, if desired, may be purified by recrystallization from a suitable solvent or from a mixture of solvents as for example, from carbon tetrachloride, butyl chloride, benzene, cyclohexane, etc. or from mixtures thereof.

The [4-[2-(hydroxymethyl)alkanoyl]phenoxy]acetic acid starting materials (II) of the instant process are conveniently obtained by the reaction of an appropriate (4-alkanoylphenoxy)acetic acid (III, infra) with an aqueous solution of formaldehyde or with its functional equivalent as, for example, with paraformaldehyde, trioxane, etc., in the presence of an acid and, preferably, in a suitable solvent such as dioxane. The reaction is most advantageously conducted with the application of heat as, for example, by heating at the reflux temperature of the reaction mixture over extended periods. The following equation illustrates this method of preparation:

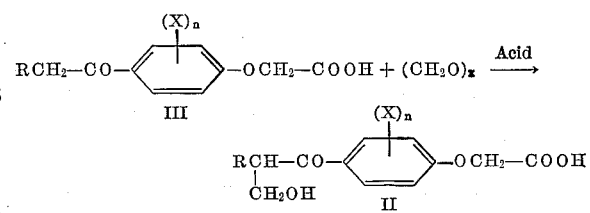

wherein R, X and $n$ are as defined above and $x$ is an integer having the value of 1 or a number greater than 1.

Usually, it is convenient to generate the [4-[2-(hydroxymethyl)alkanoyl]phenoxy]acetic acid (II) in situ, i.e., by proceeding directly from the (4-alkanoylphenoxy) acetic acid precursor (III) to the [4-(2-methylenealkanoyl)phenoxy]acetic acid product (I) without isolating the hydroxylated intermediate (II). The advantage to such an in situ formation resides in the fact that the optimum conditions employed in the preparation of the [4-[2-(hydroxymethyl)alkanoyl]phenoxy]acetic acids (II) are also the optimal conditions for converting the said intermediates (II) to their corresponding final products (I); however, making it difficult to isolate the said intermediates (II). In fact, under selected conditions of temperature and acidity, as described in some of the following examples, the conversion of the intermediates (II) to their corresponding final products (I) is so rapid that the amount of intermediate (II) in the reaction mixture at any time is appreciably small.

Included within this invention is the preparation of the nontoxic, pharmacologically acceptable salts of the instant products (I). In general, any base which will form an acid addition salt with the said [4-(2-methylenealkanoyl)phenoxy]acetic acid products (I) and whose pharmacological properties will not cause an adverse physiological effect when ingested by the body system, is considered as being within the scope of this invention; suitable bases thus include, for example, the alkali metal and alkaline earth metal hydroxides, carbonates, etc., ammonia, primary, secondary and tertiary amines such as monoalkylamines, dialkylamines, trialkylamines, nitrogen containing heterocyclic amines, for example, piperidine, etc.

This invention also relates to the preparation of ester and amide derivatives of the instant products (I) and includes all such derivatives as are compatible with the body system and whose pharmacological properties will not cause an adverse physiological effect. Esters and amides within the scope of this invention include, for example, the alkyl ester, the dialkylaminoalkyl ester and the amide, the N-alkyl amide, the N-(dialkylaminoalkyl) amide and the N-heterocyclic amide derivatives as, for example, amides derived from such heterocyclic amines as pyrrolidine, piperidine, morpholine, etc.; which esters and amides are prepared according to the process of the invention from the corresponding ester and amide derivatives of the [4-[2-(hydroxymethyl)alkanoyl]phenoxy]acetic acid starting materials which, in turn, are obtained from the corresponding ester and amide derivatives of the (4-alkanoylphenoxy)acetic acid precursors.

The foregoing and other equivalent methods for the preparation of the ester and amide derivatives of the instant products will be apparent to those having ordinary skill in the art and, to the extent that the said derivatives are both nontoxic and physiologically acceptable to the body system, the said esters and amides are the functional equivalents of the corresponding [4-(2-methylenealkanoyl)phenoxy]acetic acids (I).

The examples which follow illustrate the [4-(2-methylenealkanoyl)phenoxy]acetic acid products (I) and [4-[2-(hydroxymethyl)alkanoyl]phenoxy]acetic acid starting materials (II) of this invention and the methods by which they are prepared. However, the examples are illustrative only and it will be apparent to those having ordinary skill in the art that all of the products embraced by Formula I, supra, may be prepared in an analogous manner, by substituting the appropriate starting materials for those set forth in the examples.

EXAMPLE 1

[2,3-dichloro-4-(2-methylenebutyryl)phenoxy]acetic acid

A mixture of (2,3-dichloro-4-butyrylphenoxy)acetic acid (11.6 g., 0.04 mole), paraformaldehyde (4.88 g., 0.163 mol equiv.), p-toluenesulfonic acid monohydrate (7.6 g., 0.04 mole) and dioxane (100 ml.) is mechanically stirred and heated on a steam bath for 20 hours. The internal temperature of the reaction mixture is 86° C.

By removing a small sample of the reaction mixture at periodic intervals the presence of the intermediate [2,3-dichloro - 4 - [2-(hydroxymethyl)butyryl]phenoxy]acetic acid can be demonstrated by thin layer chromatography and infra red spectroscopy.

The solvent is removed at reduced pressure using a rotary evaporator and the residue is dissolved in dichloromethane and washed with water. The organic phase is dried over magnesium sulfate and the solvent removed in a rotary evaporator. The solid residue, 9.2 g. (76%), is identified as [2,3-dichloro - 4 - (2 - methylenebutyryl)phenoxy]acetic acid. Repeated recrystallization from carbon tetrachloride yields a purified product which melts at 124–125° C.

EXAMPLE 2

[2,3-dichloro-4-(2-methylenebutyryl)phenoxy]acetic acid

The reaction is carried out as in Example 1 except that the p-toluenesulfonic acid monohydrate is replaced by concentrated sulfuric acid (4 g., 0.08 mole equiv.) and the heating time is seven hours. The yield of once crystallized [2,3-dichloro-4-(2-methylenebutyryl)phenoxy]acetic acid is 5.1 g. (42%). Further recrystallization gives a purified product which melts at 124–125° C.

EXAMPLE 3

[2,3-dichloro-4-(2-methylenebutyryl)phenoxy]acetic acid

The reaction is carried out as in Example 1 except that the paraformaldehyde is replaced by trioxane (4.88 g., 0.16 mol equiv.), the p-toluenesulfonic acid monohydrate is replaced by concentrated sulfuric acid (2 g., 0.04 mol equiv.) and the reaction mixture is heated for 11½ hours. The yield of once recrystallized [2,3-dichloro-4-(2-methylenebutyryl)phenoxy]acetic acid is 6.5 g. (54%). Further recrystallization from carbon tetrachloride yields a purified product which melts at 124–125° C.

EXAMPLE 4

[2,3-dichloro-4-(2-methylenebutyryl)phenoxy]acetic acid

The reaction is carried out as in Example 3 except that the trioxane is replaced by 38% aqueous formaldehyde (12.64 g., 0.16 mol. equiv.) and the reaction time is 25 hours. The yield of once recrystallized [2,3-dichloro-4-(2-methylenebutyryl)phenoxy]acetic acid is 6.45 g. (53%). Further recrystallization yields a purified product which melts at 124–125° C.

EXAMPLE 5

[2,3-dichloro-4-(2-methylenebutyryl)phenoxy]acetic acid

The reaction is carried out as in Example 2 except that the amount of concentrated sulfuric acid is (2 g., 0.04 mol. equiv.) instead of (4 g., 0.08 mol. equiv.) and the heating time is 11½ hours. The yield of once recrystallized [2,3-dichloro-4-(2-methylenebutyryl)phenoxy]acetic acid is 6.5 g. (54%). Further recrystallization yields a purified product which melts at 124–125° C.

EXAMPLE 6

[2,3-dichloro-4-(2-methylenebutyryl)phenoxy]acetic acid

The reaction is carried out as in Example 1 except that p-toluenesulfonic acid monohydrate is replaced by boron trifluoride etherate (5.68 g., 0.04 mole) and the heating time is seven hours. The [2,3-dichloro-4-(2-methylenebutyryl)phenoxy]acetic acid thus obtained melts at 124–125° C. after several recrystallizations.

In a manner similar to that described in Example 1, supra, for the preparation of [2,3-dichloro-4-(2-methylenebutyryl)phenoxy]acetic acid, all of the [4-(2-methylenealkanoyl)phenoxy]acetic acid products (I) of this invention may be obtained. Thus, by substituting the appropriate (4-alkanoylphenoxy)acetic acid for the (2,3-dichloro-4-butyrylphenoxy)acetic acid of Example 1 and employing paraformaldehyde or its functional equivalent and following substantially the procedure described in Example 1, all of the [4-(2-methylenealkanoyl)phenoxy] acetic acid products and [4-[2-(hydroxymethyl)alkanoyl] phenoxy]acetic acid intermediates of this invention may be synthesized. The following equation illustrates the reaction of Example 1 and, together with Table I (infra), depict the starting materials of the process and the corresponding products and intermediates obtained therefrom:

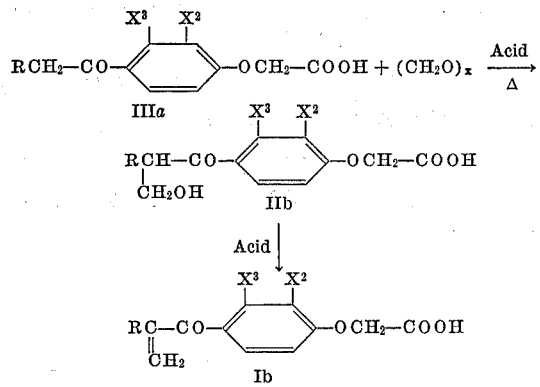

TABLE I

| Ex. | R | $X^2$ | $X^3$ | $(CH_2O)_x$ | M.P., °C., Ib |
|---|---|---|---|---|---|
| 7 | $-C_2H_5$ | H | Cl | Paraformaldehyde | 109–111 |
| 8 | $-C_2H_5$ | $-CH_3$ | $-CH_3$ | Trioxane | 83.5–84.5 |
| 9 | $-C_2H_5$ | $-CH=CH-$ | $-CH=CH-$ | 38% aqueous formaldehyde | 106–109 |
| 10 | $-CH(CH_3)_2$ | H | Cl | Trioxane | 122.5–123.5 |
| 11 | $-C_2H_5$ | Cl | $-CH_3$ | Paraformaldehyde | 89–91 |
| 12 | $-C_2H_5$ | $-CH_3$ | Cl | 38% aqueous formaldehyde | 113–114 |
| 13 | $-CH(CH_3)_2$ | Cl | Cl | Paraformaldehyde | 139–140 |
| 14 | $-C_2H_5$ | H | $-OCH_3$ | do | 110–111; 5 |
| 15 | $-CH_3$ | H | H | Trioxane | 124.5–126.5 |
| 16 | $-CH_2-CF_3$ | $-CH_3$ | $-CH_3$ | Paraformaldehyde | 82–84 |
| 17 | $-CH(CH_3)(CF_3)$ | H | $-CH_3$ | do | 116–118 |
| 18 | $-C_2H_5$ | $-CH_2-CH_2-CH_2-$ | | 38% aqueous formaldehyde | 80–82 |
| 19 | $-C_2H_5$ | $-CH_2-CH_2-CH_2-CH_2-$ | | Paraformaldehyde | 89–91 |

The products of this invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5, 10, 20, 25, 50, 100, 150, 250 and 500 milligrams, i.e., from 5 to about 500 milligrams, of the active ingredient for the symptomatic adjustment of the dosage to the patient to be treated. These dosages are well below the toxic or lethal dose of the products.

A suitable unit dosage form for the instant products can be prepared by mixing 50 mg. of a [4-(2-methylenealkanoyl)phenoxy]acetic acid or a nontoxic, pharmacologically acceptable salt, ester or amide derivative thereof with 144 mg. of lactose and 6 mg. of magnesium stearate and placing the 200 mg. mixture into a No. 3 gelatin capsule. Similarly, by employing more of the active ingredient and less lactose, other dosage forms can be put up in No. 3 gelatin capsules and should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds with other known diuretics and saluretics or with other desired therapeutic and/or nutritive agents in dosage unit form.

The following example is included to illustrate the preparation of a representative dosage form:

EXAMPLE 20

Dry-filled capsules containing 50 mg. of active ingredient per capsule

| | Per capsule, mg. |
|---|---|
| [2,3-dichloro-4-(2-methylenebutyryl)phenoxy]acetic acid | 50 |
| Lactose | 144 |
| Magnesium stearate | 6 |
| Capsule size No. 3 | 200 |

The [2,3-dichloro-4-(2-methylenebutyryl)phenoxy]acetic acid is reduced to a No. 60 powder and then lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredient of the above example by any of the other novel compounds of this invention.

It will be apparent from the foregoing that the [4-(2-methylenealkanoyl)phenoxy]acetic acid products (I), the [4-[2-(hydroxymethyl)alkanoyl]phenoxy]acetic acid intermediates (II), and the nontoxic, pharmacologically acceptable salts, esters and amide derivatives thereof, constitute a valuable class of compounds which have not been prepared heretofore. One skilled in the art will also appreciate that the processes disclosed in the above examples are merely illustrative and are capable of wide variation and modification without departing from the spirit of this invention.

What is claimed is:

1. A compound having the formula:

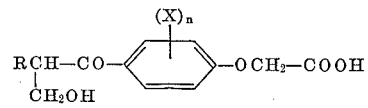

wherein R is alkyl or trifluoromethyl substituted lower alkyl; the X radicals are similar or dissimilar members selected from hydrogen, halogen, lower alkyl, lower alkoxy or, taken together, two X radicals on adjacent carbon atoms of the benzene ring may be joined to form an hydrocarbylene chain selected from trimethylene, tetramethylene or 1,3-butadienylene; and $n$ is an integer having a value of 1–2; and the nontoxic, pharmacologically acceptable salts, alkyl esters, dialkylaminoalkyl esters and amide, N-alkyl amide, N-(dialkylaminoalkyl)amide, pyrrolidide, piperidide or morpholide derivatives thereof.

2. A compound having the formula:

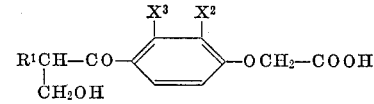

wherein $R^1$ is lower alkyl and $X^2$ and $X^3$ are similar or dissimilar members selected from hydrogen, halogen or lower alkyl; and the non-toxic, pharmacologically acceptable salts, alkyl esters, dialkylaminoalkyl esters and amide, N-alkyl amide, N-(dialkylaminoalkyl)amide, pyrrolidide, piperidide or morpholide derivatives thereof.

3. The compound of claim 2 wherein $X^2$ and $X^3$ are halogen.

4. The compound of claim 2 wherein $X^2$ is hydrogen and $X^3$ is halogen.

5. [2,3-dichloro-4-[2-(hydroxymethyl)butyryl]phenoxy]acetic acid.

6. [3-chloro - 4 - [2-(hydroxymethyl)butyryl]phenoxy] acetic acid.

References Cited
UNITED STATES PATENTS
| | | | |
|---|---|---|---|
| 2,130,592 | 9/1938 | McAllister et al. | 260—594 |
| 1,955,060 | 3/1934 | Flemming et al. | 260—594 |
| 3,364,255 | 1/1968 | Cragoe | 260—520 |

FOREIGN PATENTS
| | | |
|---|---|---|
| 513,772 | 10/1939 | Great Britain. |

OTHER REFERENCES
Morrison et al., "Organic Chemistry," Allyn & Bacon, Boston, 1959, pp. 115, 338.

LORRAINE A. WEINBERGER, Primary Examiner

D. E. STENZEL, Assistant Examiner

U.S. Cl. X.R.

260—247.7, 294.7, 326.5, 473, 501.16, 520, 559; 424—308, 317, 324